(12) United States Patent  (10) Patent No.: US 12,333,541 B2
Iliev et al.  (45) Date of Patent: Jun. 17, 2025

(54) PEER TO PEER VALUE TRANSFER

(71) Applicant: Mastercard International Incorporated, Purchase, NY (US)

(72) Inventors: Issidor Iliev, White Plains, NY (US); Erick Andrew, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 142 days.

(21) Appl. No.: 17/453,584

(22) Filed: Nov. 4, 2021

(65) Prior Publication Data

US 2022/0156744 A1  May 19, 2022

Related U.S. Application Data

(60) Provisional application No. 63/114,216, filed on Nov. 16, 2020.

(51) Int. Cl.
*G06Q 20/40* (2012.01)
*G06Q 20/32* (2012.01)
*G06Q 20/36* (2012.01)
*G06Q 20/38* (2012.01)
*G06F 9/445* (2018.01)

(52) U.S. Cl.
CPC ....... *G06Q 20/4014* (2013.01); *G06Q 20/327* (2013.01); *G06Q 20/363* (2013.01); *G06Q 20/3827* (2013.01); *G06Q 20/385* (2013.01); *G06F 9/445* (2013.01)

(58) Field of Classification Search
CPC .............................................. G06Q 20/00–425
See application file for complete search history.

(56) References Cited

U.S. PATENT DOCUMENTS

| 5,623,547 | A  |   | 4/1997  | Jones et al. |
| 6,439,455 | B1 |   | 8/2002  | Everett et al. |
| 7,233,926 | B2 |   | 6/2007  | Durand et al. |
| 8,898,086 | B2 | * | 11/2014 | Downing ........... G06Q 20/3827 705/64 |
| 9,544,759 | B2 | * | 1/2017  | Gargiulo ................ G06Q 20/40 |
| 9,934,502 | B1 | * | 4/2018  | Grassadonia ......... H04W 12/06 |
| 10,652,223 | B1 | * | 5/2020 | Hayes ................... H04L 67/104 |

(Continued)

FOREIGN PATENT DOCUMENTS

EP  0421808 B1  4/1991
WO  2012/123394 A1  9/2012

OTHER PUBLICATIONS

International Search Report and Written Opinion dated Feb. 28, 2022 which was issued in connection with PCT Application No. PCT/US21/057721.

(Continued)

*Primary Examiner* — Chenyuh Kuo
(74) *Attorney, Agent, or Firm* — Buckley, Maschoff & Talwalkar LLC

(57) ABSTRACT

System and methods and computer program code are provided to transfer value from a first wallet application on a first mobile device to a second wallet application on a second mobile device. Pursuant to some embodiments, the transfer is performed over a short or medium range communications protocol and does not require for either or both devices to be "online" or connected to a remote network device or system.

12 Claims, 4 Drawing Sheets

(56) References Cited

U.S. PATENT DOCUMENTS

| | | | |
|---|---|---|---|
| 10,783,517 B2* | 9/2020 | Grassadonia | G06Q 20/0855 |
| 11,295,297 B1* | 4/2022 | Kushner | G06Q 20/3224 |
| 2006/0277144 A1* | 12/2006 | Ranzini | G06Q 20/1235 |
| | | | 705/39 |
| 2009/0265272 A1* | 10/2009 | Dill | G06Q 20/1085 |
| | | | 705/41 |
| 2012/0136732 A1* | 5/2012 | McMillen | G06Q 20/105 |
| | | | 705/16 |
| 2013/0238903 A1* | 9/2013 | Mizunuma | G06F 21/31 |
| | | | 713/176 |
| 2015/0100499 A1 | 4/2015 | Dua | |
| 2016/0275476 A1 | 9/2016 | Artman et al. | |
| 2018/0068293 A1* | 3/2018 | Dunne | G06Q 20/3672 |
| 2019/0295068 A1 | 9/2019 | MacQuilken | |
| 2020/0019951 A1 | 1/2020 | Artman et al. | |
| 2020/0154275 A1* | 5/2020 | Louis | H04W 12/03 |
| 2021/0065173 A1* | 3/2021 | Lakshmanan | G06Q 20/02 |
| 2021/0312437 A1* | 10/2021 | Torii | G06Q 20/381 |
| 2023/0306414 A1* | 9/2023 | Vudathu | H04L 9/0866 |
| | | | 705/66 |

OTHER PUBLICATIONS

Extended European Search Report dated Sep. 13, 2024 which was issued in connection with European Patent Application No. 21892587.3.

* cited by examiner

PEER TO PEER VALUE TRANSFER

CROSS REFERENCE TO RELATED APPLICATION

This application claims the benefit of U.S. Provisional Patent Application No. 63/114,216 filed on Nov. 16, 2020, the contents of which provisional application are hereby incorporated by reference for all purposes.

BACKGROUND

More and more people prefer to use electronic methods of payment rather than physical cash. Unfortunately, many electronic methods of payment (such as the use of credit cards and credit card readers, or online transactions such as those provided by PayPal® or Venmo®) require that one or both of the participants in a transaction be "online" or connected to a remote network device or system. Physical cash methods of payment also have a high level of privacy, with the transaction typically known only to the parties exchanging the payment. It would be desirable to provide systems and methods for conducting transfers of value that offer the convenience and advantages of electronic payments while preserving any of the benefits associated with physical cash payments.

It would be desirable to provide systems and methods for conducting transfers of value even where there is no network connection available or where such network connection is slow or unreliable. It would further be desirable to provide such systems and methods that maintain high level of privacy and are both secure and easy to operate.

SUMMARY OF THE INVENTION

According to some embodiments, systems, methods, apparatus, computer program code and means are provided to transfer value from a first wallet application on a first mobile device to a second wallet application on a second mobile device. In some embodiments, the first mobile device receives a message from a second mobile device including information identifying a second wallet application on the second mobile device, and a wallet application on the first mobile device confirms the validity of the second wallet application. The first mobile device transmits a request to transfer an amount of value from the first wallet application to the second wallet application and sets a timer. If a confirmation is received from the second wallet application before expiration of the timer, then the transfer of value to the second wallet application is finalized.

In some embodiments, the communication session between the first and second mobile device is over a short or medium range communication protocol such as Bluetooth, NFC, or WiFi. In some embodiments, the mobile devices are in an off-line mode of operation during the transaction. In some embodiments, a status of the first wallet application is set to be active after confirming the validity of the second wallet application. In some embodiments, until both wallet applications have been set to be active, no transfer of value may take place.

In some embodiments, the information identifying the second wallet application is an encrypted hash of a wallet identifier, and the method further includes decrypting the encrypted hash to obtain a hash of the wallet identifier and comparing the hash of the wallet identifier to a list of valid hashes.

In some embodiments, finalizing the transfer of value includes incrementing a balance of the second wallet application while reducing the balance of the first wallet application by the value.

Some technical effects of some embodiments of the invention are improved and computerized ways to securely validate wallet applications with which each wallet may interact. A wallet that has not been placed into an active state is unable to send or receive value. With these and other advantages and features that will become hereinafter apparent, a more complete understanding of the nature of the invention can be obtained by referring to the following detailed description and to the drawings appended hereto.

DETAILED DESCRIPTION

Figure 1:
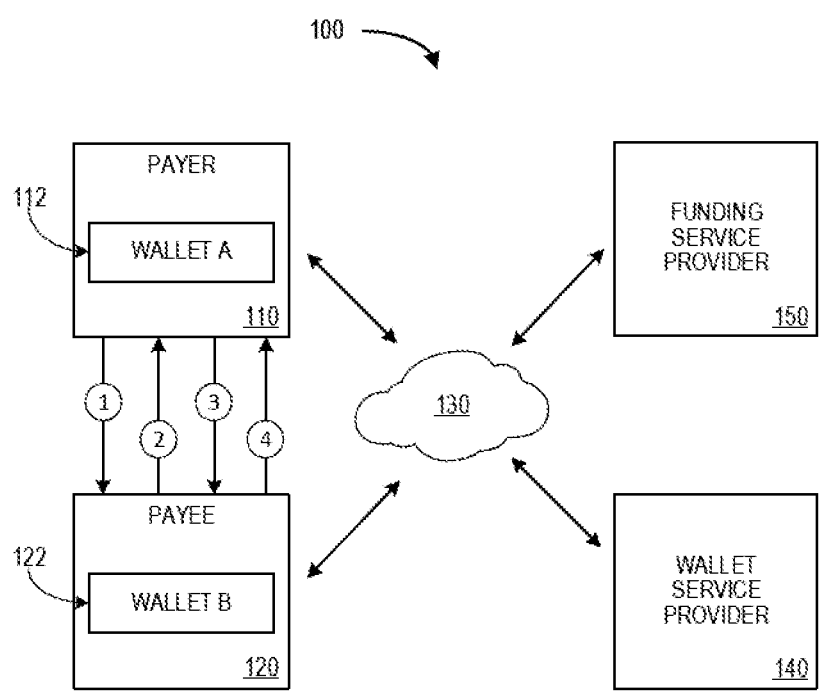
FIG. 1 is a high-level block diagram of a system according to some embodiments.

The present invention provides significant technical improvements to interactions requiring the transfer of value between two entities operating computing devices. Pursuant to some embodiments, value may be transferred even in situations where the computing devices are "off-line" (or are otherwise unable to communicate with a central issuing authority or payment network). The present invention is directed to more than merely a computer implementation of a routine or conventional activity previously known in the industry as it significantly advances the technical efficiency, access and/or accuracy of interactions between devices by implementing a specific new method and system as defined herein. The present invention is a specific advancement in the area of peer to peer transfer and provides benefits in security, privacy and the ability to easily validate participants in the peer to peer transfer even in situations where the participants are unable to communicate with a network or other authority.

For convenience and ease of exposition, a number of terms are used herein. For example, the term "payor" is used herein to refer to an entity (such as an individual) operating a computing device to transfer value to a "payee" (an entity such as an individual operating a second computing device). The "payor" and "payee" may be individuals or they may be merchants or other entities that wish to send and receive value using features of the present invention.

As used herein, the term "digital wallet" refers to an application installed on a "mobile device" that allows a user to conduct peer to peer transactions with other digital wallets configured pursuant to the present invention. Each digital wallet may store some indication of an amount (or balance) of "value" contained within the digital wallet. The value may be, for example, a currency amount, an amount of points or tokens or the like.

As used herein, a "mobile device" may be a portable device that can be transported and be operated by a user, and may include one or more electronic components (e.g., an integrated chip, etc.). A mobile device according to some embodiments may be in any suitable form including, but not limited to a mobile phone (e.g., smart phone, cellular phone, etc.), a tablet computer, a portable media player, a personal digital assistant device (PDA), a wearable communication device (e.g., watch, bracelet, glasses, etc.), an electronic reader device, a laptop, a netbook, an ultrabook, etc. A portable communication device may also be in the form of a vehicle (e.g., a car) equipped with communication capabilities.

Prior to discussing features of the present invention in detail, an illustrative example will first be presented. The illustrative example is not intended to be limiting in any way and is simply provided for explanatory purposes. In the illustrative example, two individuals have mobile devices that have been configured with software (or "wallets") pursuant to the present invention. One of the individuals ("payor") has interacted with her bank to load her wallet with value (in this example, she has loaded $50 of value onto her wallet). The other individual ("payee") has not loaded any value onto his wallet. The payor wishes to send payee $10, but the two mobile devices are in a location or situation where neither device has cellular data access or Internet connectivity. Embodiments of the present invention allow the two individuals to interact via local communication technologies such as via near field communication ("NFC"), Bluetooth, WiFi or the like and to transfer value as will now be described.

FIG. 1 is a high-level block diagram of a system 100 according to some embodiments of the present invention. As shown, the system 100 includes several entities that may be involved in a value transfer transaction pursuant to the present invention, including a payor device 110, a payee device 120 as well as a network 130, a funding service provider 150 and a wallet service provider 140. As will be described further herein, only the payor device 110 and the payee device 120 are involved in most transactions. However, in some situations, such as when value is loaded or withdrawn from a device 110, 120 a network 130 and one or more funding service provider devices 150 may be involved. Further, in some situations, such as when a device 110, 120 requires an update of data or other information, a network 130 and one or more wallet service provider devices 140 may be involved in a transaction.

Prior to conducting a transaction, each of the users may enroll their respective mobile devices 110, 120 to participate in the transaction service of the present invention by downloading a wallet application 112, 122 onto their mobile device 110, 120. The information regarding the mobile device 110, 120, the wallet application 112, 122 and the user may be stored at, or be accessible to, the wallet service provider 140. Pursuant to some embodiments, each wallet application 112, 122 has a unique identifier (referred to herein as the "wallet ID"). For example, as used herein, the wallet ID of wallet 112 is "A" and the wallet ID of wallet 122 is "B". In use, the wallet IDs will be selected to have sufficient alphanumeric characters to ensure that all wallet IDs are unique. The wallet IDs may be issued or assigned by an entity such as, for example, the wallet service provider 140 and is used to uniquely identify each wallet as will be described further herein.

Each wallet application 112, 122 may be configured with one or more cryptographic algorithms and related data. For example, pursuant to some embodiments, each wallet application 112, 122 is configured with a standardized hashing algorithm (that is standardized across all the wallet applications 112, 122 and wallet service providers 140 participating in the transaction system of the present invention). The hashing algorithm is configured to be able to receive a wallet ID from another wallet (e.g., wallet application 122 may receive a wallet ID from wallet application 112) and process it to achieve a specific unique hash. One suitable hashing algorithm that may be used is the SHA-256 algorithm (described in NIST FIPS PUB 180-2) although other similar hashing algorithms may be used so long as the algorithm guarantees that, provided the same input the same output will be generated. As used herein, the hashed version of a wallet ID will be referred to as the hash(wallet ID) (so, the hashed version of wallet 112 is hash(A)), and the hashed versions may be generally referred to as "hashed keys" or "hashed IDs".

Each wallet application 112, 122 is also configured with a public key cryptography system that allows each participating wallet application 112, 122 to exchange information with other participants in the system 100 using a standard public/private key encryption mechanism. In general, each wallet application 112, 122 may be able to encrypt its wallet ID for transmission to another participating wallet application 112, 122 such that the recipient wallet application is able to decrypt the wallet ID as will be described further herein.

Each wallet application 112, 122 is also configured with local storage that allows, for example, the storage of an exhaustive list of all the hashed keys of other wallet applications in the system. This list may be provided to the wallet applications 112, 122 from one or more wallet service providers 140, and may be initially provided when the wallet application 112, 122 is installed on the mobile device 110, 120. The list may be updated periodically when a mobile device 110, 120 is online and able to interact with a wallet service provider 140. The list is updated to include any new wallets and to delete any cancelled or terminated wallets. Pursuant to some embodiments, only the hashed keys are included in the list to ensure that any malicious actors are unable to obtain wallet IDs by compromising local encryption. Pursuant to some embodiments, the number of wallet keys included in the list stored in each wallet application 122, 122 may depend on the number of participating users in the system. In some embodiments, a financial institution may issue wallet applications to its customers allowing the customers to conduct peer to peer value transfers to other customers. An example of such embodiment would be issuing wallet applications to a set of customers expected to temporarily reside in a location with no or highly latent network connection, e.g. traveling in space. In some embodiments, an entire region or country may allow any user to conduct peer to peer value transfers to other users in the region or country (in which case, each wallet application will store a list of all users in that region or country). Embodiments allow a large number of users to conduct peer to peer transactions with each other, and the list need not be limited by financial institution, region, or country.

As shown in FIG. 1, the two mobile devices 110, 120 are interacting via a series of messages (shown as messages 1-4) to conduct a transfer of value. Continuing the illustrative example introduced above, the mobile device 110 is operated by a payor who wishes to send $10 to a payee who is operating mobile device 120. Both devices have been configured to have installed wallet applications 112, 122 allowing them to participate in a value transfer of the present invention. While the details of the messages and processing performed by each of the mobile devices 110, 120 will be described in further detail below in conjunction with FIGS. 2-3, a brief overview will now be provided.

In the transaction shown in FIG. 1, the payor initiates the transfer by sending information to the payee in message "1". The payee uses information from the first message to confirm the validity of the wallet 112. By first confirming the validity of the wallet 112, the payee can avoid interacting with any mobile devices and wallet applications that are fraudulent or unauthorized. If the validity is confirmed, the payee wallet changes its state to "active", allowing the transaction to proceed, and the wallet application 122 causes a message "2" to be sent to the payor. Message "2" includes information identifying wallet application 122 which is used by wallet application 112 to confirm the validity of the payee wallet application 122. If the validity is confirmed, the payor wallet application 112 causes a further message "3" to be sent which includes information about the amount of value to be transferred as well as a random code such as a short 3-5 digit PIN. The payee wallet application 122 processes the received message and sends a confirmation message "4" which causes the payor wallet application 112 to reduce its balance by the amount of the value and causes the payee wallet application 122 to be increased by the amount of the received value. The payee may then use that received value in subsequent transactions to transfer some or all of the value to other participants in the system of the present invention. The payee may also convert the value to a fiat currency (such as US dollars) by interacting with an entity such as a funding service provider 150 to withdraw the value from the wallet.

Pursuant to some embodiments, the funding service provider 150 and the wallet service provider 140 may be a payment network service provider such as, for example, Mastercard International Incorporated (referred to herein as "Mastercard"). The funding service provider 150 may be a financial institution that is able to interact with wallet applications 112, 122 of the present invention (e.g., by confirming the validity of each wallet by validating hashes and encrypted hashes as described herein) and is able to conduct peer to peer value transfers with those wallet applications. Interactions with a funding service provider 150 may result in value being exchanged into (or from) currency or other tangible forms of value. For example, the $10 of value on the payor's wallet application 112 at the start of the transaction may have been transferred onto that wallet application 112 from the payor's bank account at funding service provider 150. Funds may be transferred from credit cards, bank accounts, or other sources of value such as PayPal or the like.

Mobile devices according some embodiments can be configured to communicate with external entities (such as wallet service providers 140, funding service providers 150 or the like) through long range communications technologies and protocols such as cellular communication and Internet protocols (represented by network 130 in FIG. 1). They may also be configured to communicate with other devices (such as other mobile devices 110, 120) using any suitable short or medium range communications technology including Bluetooth (classic and BLE—Bluetooth low energy), NFC (near field communications), IR (infrared), Wi-Fi, etc. In general, as used herein, when longer range communications are available the mobile device will be referred to as "on-line" and such communications are not available the mobile device will be referred to as "off-line" (but still able to communicate with other mobile devices using short or medium range technologies).

Some or all of the processing described herein may be performed automatically or otherwise be automated by one or more computing devices or systems. As used herein, the term "automate" may refer to, for example, actions that can be performed with little (or no) intervention by a human.

Further details of peer to peer value transfer transactions pursuant to some embodiments will now be described by reference to FIG. 2 (where a value transfer process 200 is shown from the perspective of the payor mobile device 110) and FIG. 3 (where a value transfer process 300 is shown from the perspective of the payee mobile device 120). Similar processes may be used to load or unload value into wallet applications in transactions involving funding service providers 150 and will not be described separately herein.

Figure 2:
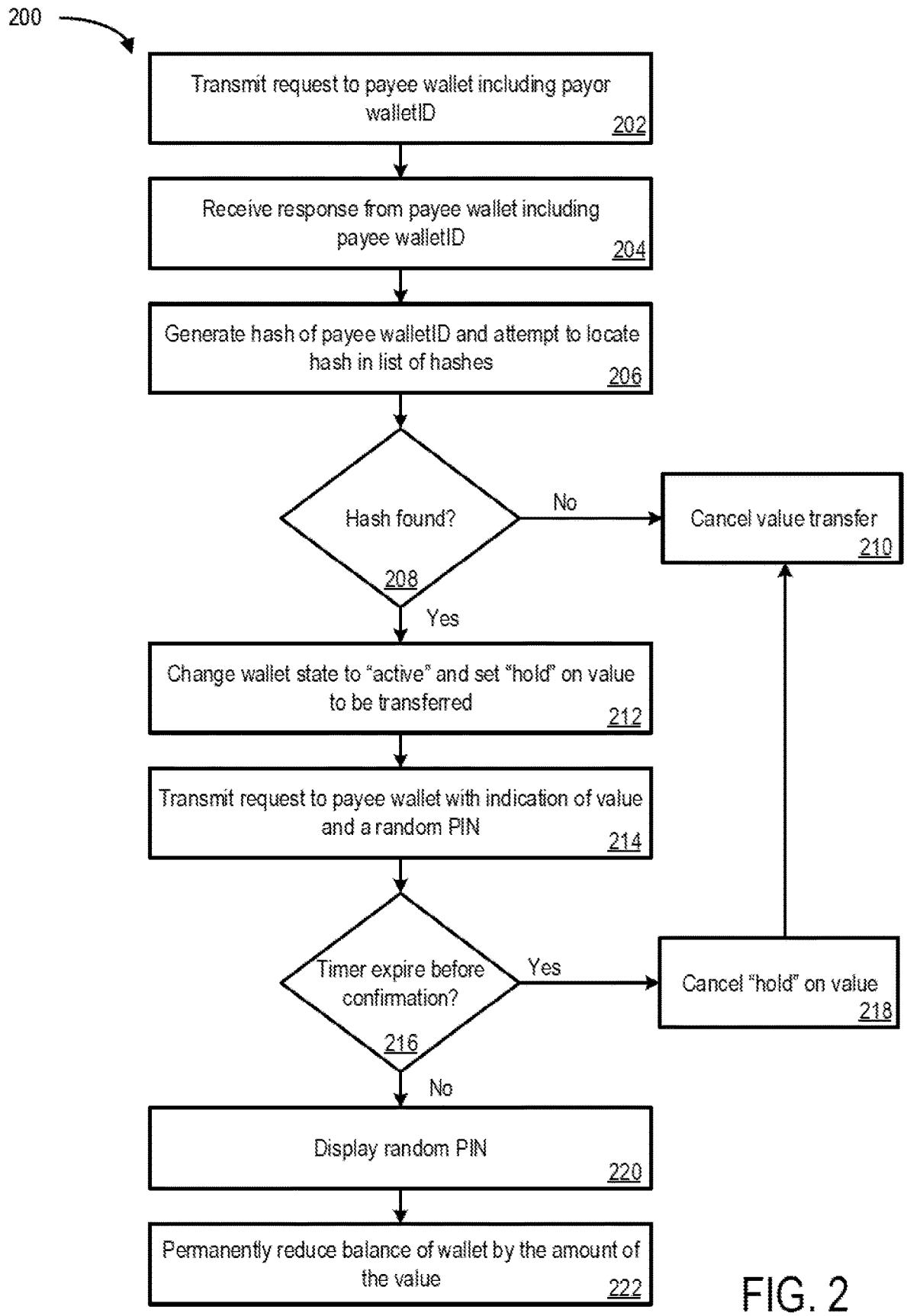
FIG. 2 is a flow diagram depicting a value transfer process according to some embodiments.

Referring first to FIG. 2, a value transfer transaction process 200 begins at 202 where the wallet application 112 of the payor mobile device 110 is operated to transmit a request message to the payee wallet application 122 of the payee mobile device 120. Although not shown, the payee and payor mobile devices 110, 120 may already be in communication using Bluetooth or some other form of communication. Alternatively, in some embodiments, the devices may come into communication as part of process 200 (e.g., at 202). In some embodiments, the request message at 202 may include information identifying the payor wallet application 112, such as the payor wallet ID (which is subsequently used by the payee wallet application 122 to validate the authenticity of the payor wallet application 112 as will be described further below in conjunction with FIG. 3). In some embodiments, the request message includes an encrypted hash associated with the payor wallet application 112 (referred to as hash(A)). The payee wallet application 122 performs processing in response to the request (as will be described further in conjunction with FIG. 3). If the processing at the payee device is successful, processing at the payor mobile device 110 continues at 204.

Processing continues at 204 where the payor wallet application 112 of the payor mobile device 110 receives a response from the payee wallet application 122 including information identifying the payee wallet application 122 (such as the payee wallet ID). In some embodiments, the response message at 204 may include an encrypted hash associated with the payee wallet application 122 (referred to as hash(B)). Processing continues at 206 where the payor wallet application 112 operates to use a hashing algorithm (the algorithm that is used by all of the devices in the system 100 as described above) to generate a hash using the payee wallet ID. Because the same hashing algorithm is used by both the payor wallet application 122 and the wallet service provider 140, the hash generated by the payor wallet application 122 and the wallet service provider 140 should be identical.

A determination is then made at 208. If the hash generated by the payor wallet application 112 was not found in the list of hashes, processing continues at 210 where the wallet application 112 cancels the value transfer process (as the payee wallet application 122 is not an application that the wallet application 112 is permitted to transact with). If, however, the hash was found in the list of hashes, processing continues at 212 where the wallet application 112 operates to change the wallet state to "active". Pursuant to some embodiments, an "active" state means that the wallet is ready to send or receive funds from another wallet. If either wallet in a transaction is in an "inactive" state, no value transfer can occur. Processing at 208 also includes placing a "hold" on the amount of value to be transferred to the payee. For example, in the illustrative example, the $10 to be transferred from wallet A will be marked as "unavailable" or "blocked". In this way, unless the transaction is aborted or canceled as will be described further herein, the funds are no longer available in wallet A.

In some embodiments, where the response received at 204 included an encrypted hash of the payee wallet ID, processing at 206 and 208 may include operating the payor wallet application 112 to decrypt the encrypted hash(B) and attempts to locate the hash(B) in the list of hashes stored in local storage (where the presence of a hash(ID) on the list in local storage indicates that the wallet application associated with the hash(ID) is an authorized and valid wallet application). In either event, (whether an encrypted hash or a clear text wallet ID is received at 204), embodiments provide a secure approach to validating the authenticity of a counterparty wallet application in each transaction.

The payee wallet application 122 processes the message from the payor wallet and is expected to return a confirmation message. Because the confirmation message may not arrive immediately, a timer is started when the request at 214 is transmitted. If the payee does not respond with a confirmation before the timer expires, the value transfer is canceled. For example, if the timer expires before confirmation at 216, processing continues at 218 where the payor wallet application 112 removes or cancels the "hold" on the value. In the example, the $10 in wallet A is marked as "available" again for the payor's use. Processing continues at 210 and the value transfer transaction is canceled.

If, however, a confirmation message is received before the timer expires at 216, processing continues at 220 where the payor wallet application 112 causes the random PIN to be displayed on a display device of mobile device 110. The display may also prompt the user of mobile device 110 (the payor) to communicate the random PIN to the payee (the operator of mobile device 120). This ensures the finality of the funds transfer. As will be discussed further below, the payee enters the PIN into their mobile device 120 to finalize the transaction. Pursuant to some embodiments, the random PIN is not displayed or known to either user until 220 to reduce the risk of fraud. Until this point, the random PIN was only known to the wallet applications 112, 122. While a random PIN is referred to herein, those skilled in the art, upon reading the present disclosure, will appreciate that the random PIN may be any semi-random code generated that is preferably difficult to generate or anticipate and that is relatively short in length (e.g., such as a code having four or five digits or characters).

From the perspective of the payor mobile device 110 and the payor wallet application 112, the value transfer transaction 200 is completed at 222 and the wallet application 112 balance is permanently reduced by the amount of value transferred.

Figure 3:
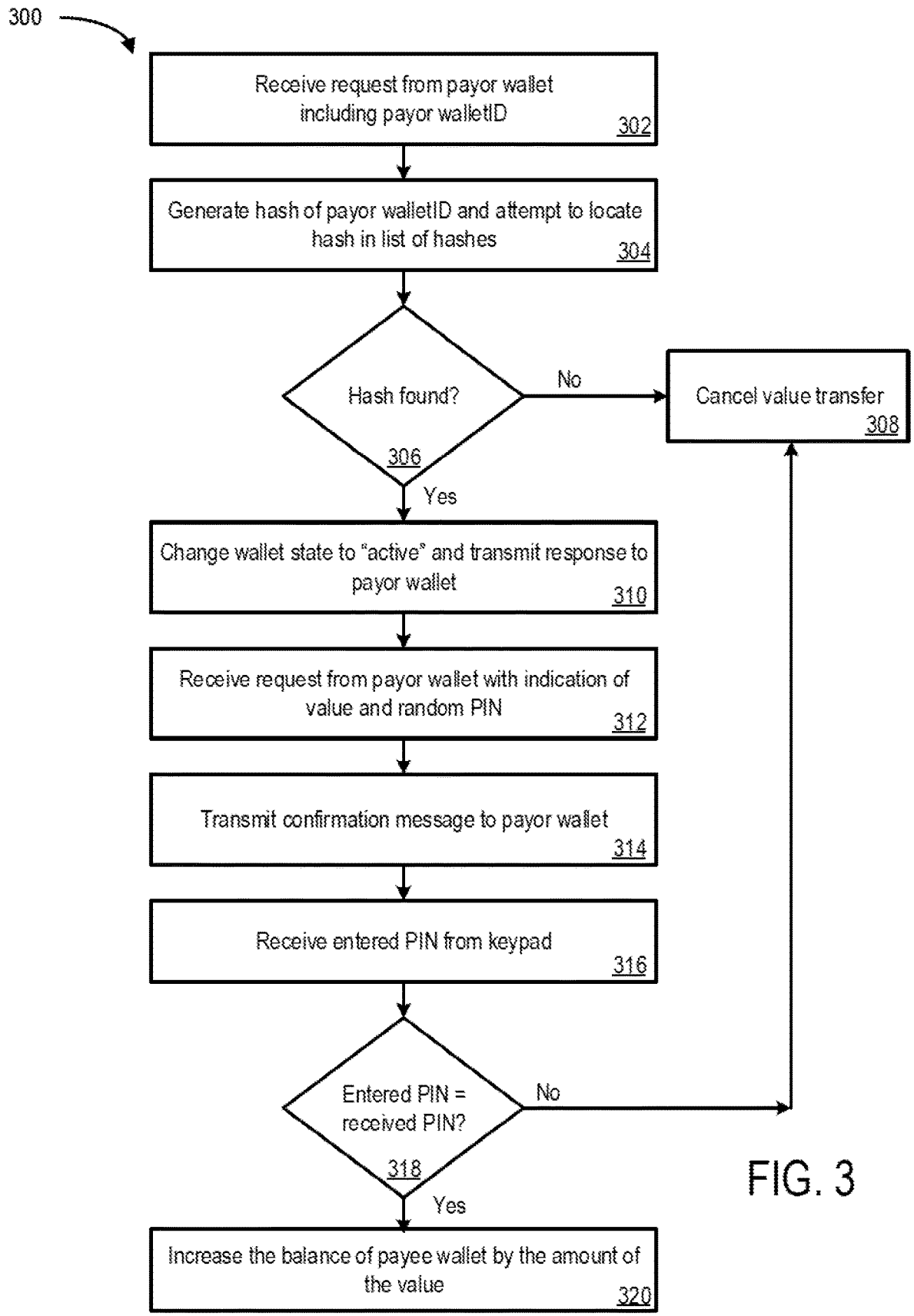
FIG. 3 is a flow diagram a value transfer process according to some embodiments.

Reference is now made to FIG. 3 where a value transfer transaction 300 from the perspective of a payee mobile device 120 and payee wallet application 122 is shown. Again, as will the process 200, processing assumes that two devices (such as two mobile devices 110, 120 or a mobile device and a funding service provider 150) are interacting and that both devices have a wallet application 112, 122 (or an equivalent in the case of a funding service provider 150) stored thereon. Process 300 begins at 302 where the payee wallet application 122 receives a request from a payor wallet application 112 which includes information identifying the payor wallet application 112 such as a payor wallet ID. In some embodiments, the information identifying the payor wallet application 112 may be, for example, an encrypted hash of the payor's wallet ID (hash(A)). At 304, the payee wallet application 122 performs processing to retrieve or generate a hash of the payor wallet ID by either using a hashing algorithm in conjunction with the payor wallet ID to generate the hash or by decrypting the encrypted hash (e.g., using a private key that corresponds to the public key used to encrypt the hash) to produce an unencrypted hash of the payor wallet ID. Processing continues at 306 where the payee wallet application 122 attempts to match the generated or unencrypted hash of the payor wallet ID with a hash in the local storage list of hashes stored in the payee device 120.

If the search for a matching hash is unsuccessful, processing continues at 308 where the value transfer transaction 300 is canceled. That is, the transaction is not able to be completed because the payee wallet application 122 was unable to confirm that the payor wallet application 112 was a legitimate wallet application. If, however, the processing at 306 results in the unencrypted hash being found within the list of hashes (confirming the validity of the payor wallet application 112), processing continues at 310 where the payee wallet application 122 changes the wallet state from "inactive" to "active" and transmits a response to the payor wallet application 112. The response to the payor wallet application 112 may include an encrypted wallet hash of the payor wallet (e.g., hash(B)). The response also includes information indicating that the payee wallet is now in an "active" state and ready to receive a value transfer.

The payor wallet application 112 performs processing (as described in FIG. 2 at 203-212) and if the payor was able to confirm the validity of the payee wallet application 122, processing continues at 312 where the payee wallet application 122 receives a request from the payor wallet application 112 with an indication of the amount of value to be transferred as well as a randomly generated PIN. If the payee wallet application 122 receives the request (and is not turned off or otherwise unable to receive the request or send a confirmation message), the payee wallet application 122 sends a confirmation message back to the payor wallet application 112 at 314. The confirmation message confirms that the payee has received the request to receive funds and that the mobile device 120 is not turned off or unable to receive the request (or send the response). If the confirmation message is not transmitted promptly (e.g., within five seconds), the transfer may be canceled.

If the confirmation message was sent at 314, processing continues at 316 where the payee wallet application 122 prompts the user (the payee) to enter the randomly generated PIN provided by the user of the payor device 110 (e.g., at step 220 of FIG. 2). In some embodiments, the PIN must be entered within a set amount of time (e.g., 1 minute) to reduce risk of fraud. If the mobile device 120 turns off unexpectedly (e.g., due to a low battery), the timer may be continue from the time the device turned off, allowing the user time to enter the PIN. Processing continues at 318 where a determination is made whether the entered PIN is the same as the PIN received at 312. If not, processing continues at 308 and the value transfer is canceled. If the entered PIN is the same as the received PIN, processing continues at 320 where the balance of the payee wallet is increased by the amount of the value and the value transfer process is completed.

Figure 4:
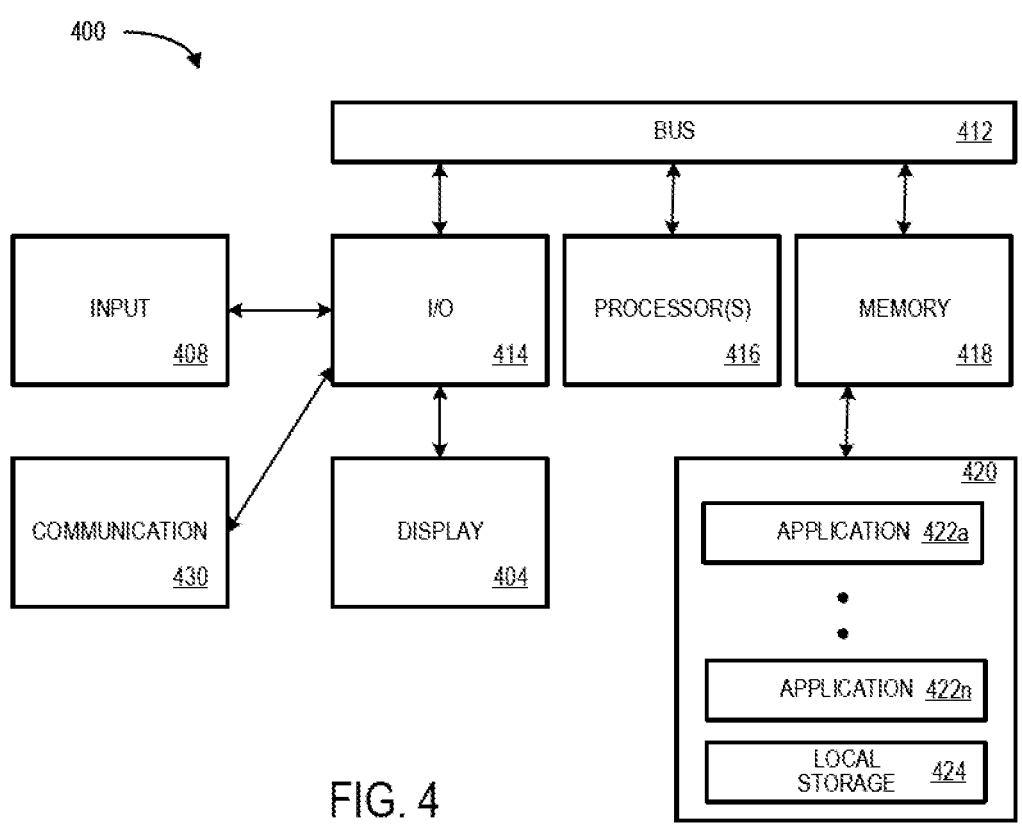
FIG. 4 is a block diagram of an apparatus in accordance with some embodiments of the present invention.

The embodiments described herein may be implemented using any number of different hardware configurations. FIG. 4 illustrates a mobile device 400 that may be used in any of the methods and processes described herein, in accordance with an example embodiment. For example, the mobile device 400 may be operated as either the payor device 110 or the payee device 120 of FIG. 1.

In some embodiments, device 400 can include some or all of the components described with respect to FIGS. 1-3. Device 400 has a bus 412 or other electrical components that operatively couple an input/output ("I/O") section 414 with one or more computer processors 416 and memory section 418. I/O section 414 can be connected to a display 404, which can have one or more aspects such as a touchsensitive component (not shown). In addition, I/O section 414 can be connected with communication unit 430 for receiving application and operating system data, using Wi-Fi, Bluetooth, near field communication (NFC), cellular, and/or other wireless communication techniques (e.g., to allow the device 400 to interact with other mobile devices to conduct transactions as described herein or to interact with funding service providers 150 and wallet service providers 140). Mobile device 400 can include one or more input mechanisms 406 such as a keypad, a button, a touch-screen display, or the like.

Input mechanism 408 is, optionally, a microphone, in some examples. Mobile device 400 optionally includes various sensors (not shown), such as a GPS sensor, accelerometer, directional sensor (e.g., compass), gyroscope, motion sensor, and/or a combination thereof, all of which can be operatively connected to I/O section 414.

Memory section 418 mobile device 400 can include one or more non-transitory computer-readable storage mediums, for storing computer-executable instructions, which, when executed by one or more computer processors 416, for example, can cause the computer processors to perform the techniques described below, including processes 200 and 300. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Mobile device 400 is not limited to the components and configuration of FIG. 4 but can include other or additional components in multiple configurations.

Memory section 418 may store one or more applications 422a-n including, for example, a wallet application 112, 122 as described herein. Memory section 418 may also provide local storage for the storage of a list of wallet keys as described herein, as well as storage for one or more cryptographic applications.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed:

1. A computerized method to operate a first mobile device having a first wallet application storing a value to act as a payor in a transaction, the method performed by the first mobile device and comprising:
   transmitting, from the first wallet application, a request to conduct a transaction to a second wallet application of a second mobile device, the second mobile device acting as a payee in the transaction, the first wallet application and the second wallet application downloaded from a wallet service provider and configured for use in a payment system, the payment system including a plurality of wallet applications downloaded on a plurality of mobile devices, each of the plurality of wallet applications identified by a unique hash;
   receiving a message from the second mobile device including (i) information identifying the second wallet application on the second mobile device and (ii) a received hash of the information identifying the second wallet application;
   generating, by the first mobile device using the first wallet application, a hash of the information identifying the second wallet application;
   confirming a validity of the second wallet application by confirming that (i) the generated hash matches the received hash, and (ii) the generated hash is in a list of hashes stored on the mobile device, wherein the list of hashes includes the unique hash for each of the plurality of wallet applications in the payment system and wherein the list of hashes is provided to the mobile device from the wallet service provider;
   changing a wallet state of the first wallet application to be in an active state in response to confirming the validity of the second wallet application;
   transmitting, to the second mobile device, a request to transfer an amount of value from the first wallet application to the second wallet application, the request including information indicating that the first wallet is in an active state and ready to conduct a value transfer;

setting a timer in the first wallet application in response to submitting the request;

receiving a confirmation from the second wallet application before expiration of the timer; and finalizing the transfer of the amount of value from the first wallet application to the second wallet application.

2. The computerized method of claim 1, further comprising:

establishing a communication session with the second mobile device.

3. The computerized method of claim 2, wherein the communication session is over a short or medium range communication protocol.

4. The computerized method of claim 1, wherein the information identifying the second wallet application is one of (i) an encrypted hash of a wallet identifier, and (ii) a wallet identifier.

5. The computerized method of claim 4, further comprising:

decrypting the encrypted hash to obtain a hash of the wallet identifier.

6. The computerized method of claim 5, wherein generating, by the first mobile device using the first wallet application, a hash further comprises:

generating a hash of the information identifying the second wallet application using a hashing algorithm established by the wallet service provider.

7. The computerized method of claim 1, wherein the list of hashes is stored in a memory of the first mobile device.

8. The computerized method of claim 1, further comprising:

receiving an indication from the second mobile device that the second wallet application has been placed in an active status prior to transmitting the request to transfer an amount of value.

9. The computerized method of claim 1, wherein the transmitting a request to transfer an amount of value further comprises:

generating a code and transmitting the code in the request.

10. The computerized method of claim 9, wherein the transmitting a request to transfer an amount of value further comprises:

placing a hold on the amount of value in the first wallet application.

11. The computerized method of claim 10, wherein finalizing the transfer of value further comprises:

permanently reducing a balance of the first wallet application by the amount of value.

12. A non-transitory, computer-readable medium storing instructions, that, when executed by a processor of a first mobile device, cause the processor to perform a value transfer method comprising:

transmitting, from a first wallet application of the first mobile device, to a second wallet application of a second mobile device, a request to conduct a value transfer, the first mobile device operating as a payor device and the second mobile device operating as a payee device in the value transfer, the first wallet application and the second wallet application downloaded from a wallet service provider and configured for use in a payment system, the payment system including a plurality of wallet applications downloaded on a plurality of mobile devices, each of the plurality of wallet applications identified by a unique hash;

receiving a message from the second mobile device including (i) information identifying a second wallet application on the second mobile device, and (ii) a received hash of the information identifying the second wallet application;

generating, using the first wallet application, a hash of the information identifying the second wallet application;

confirming the validity of the second wallet application by confirming that (i) the generated hash matches the received hash, and (ii) the generated hash is in a list of hashes stored on the first mobile device, wherein the list of hashes includes the unique hash for each of the plurality of wallet applications in the payment system and wherein the list of hashes is provided to the first mobile device from the wallet service provider;

changing a wallet state of the first wallet application to be in an active state in response to confirming the validity of the second wallet application;

transmitting, to the second mobile device, a request to transfer an amount of value from the first wallet application to the second wallet application, the request including information indicating that the first wallet is in an active state and ready to conduct a value transfer;

setting a timer in the first wallet application in response to submitting the request;

receiving a confirmation from the second wallet application before expiration of the timer; and finalizing the transfer of value from the first wallet application to the second wallet application.

* * * * *